US007110832B2

(12) United States Patent
Ghent

(10) Patent No.: US 7,110,832 B2
(45) Date of Patent: Sep. 19, 2006

(54) ENERGY MANAGEMENT SYSTEM FOR AN APPLIANCE

(75) Inventor: Bobby A. Ghent, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 581 days.

(21) Appl. No.: 10/278,240

(22) Filed: Oct. 23, 2002

(65) Prior Publication Data

US 2003/0178894 A1  Sep. 25, 2003

Related U.S. Application Data

(60) Provisional application No. 60/366,829, filed on Mar. 22, 2002.

(51) Int. Cl.
| G05B 11/01 | (2006.01) |
| G01R 21/00 | (2006.01) |
| G01R 21/06 | (2006.01) |
| G01R 11/56 | (2006.01) |
| H02J 1/00 | (2006.01) |
| H02J 3/14 | (2006.01) |

(52) U.S. Cl. .............................. 700/16; 700/18; 700/22; 700/296; 700/297; 702/61; 705/412; 307/39

(58) Field of Classification Search .................. 700/11, 700/12, 14–18, 22, 286, 297, 296; 340/310.01, 340/500, 501, 521, 540, 541; 713/300, 320; 307/38, 39; 702/60–62; 705/412
See application file for complete search history.

(56) References Cited

U.S. PATENT DOCUMENTS

| 4,348,730 A * | 9/1982 | Emerson et al. ............... 702/62 |
| 4,612,619 A * | 9/1986 | Culp ........................... 700/296 |
| 4,940,079 A * | 7/1990 | Best et al. .................... 165/236 |
| 4,998,024 A * | 3/1991 | Kirk et al. ...................... 307/40 |
| 5,289,362 A * | 2/1994 | Liebl et al. .................... 700/22 |
| 5,430,430 A * | 7/1995 | Gilbert .................... 340/310.01 |
| 5,696,695 A * | 12/1997 | Ehlers et al. ................ 700/286 |
| 5,708,589 A * | 1/1998 | Beauvais ..................... 700/293 |
| 5,748,104 A * | 5/1998 | Argyroudis et al. ... 340/870.11 |
| 5,796,604 A * | 8/1998 | Le Van Suu .................... 700/3 |
| 6,026,651 A * | 2/2000 | Sandelman ................... 62/155 |
| 6,167,389 A * | 12/2000 | Davis et al. ................. 705/412 |
| 6,455,954 B1 * | 9/2002 | Dailey .......................... 307/66 |
| 6,552,525 B1 * | 4/2003 | Bessler .................... 324/103 R |
| 6,591,253 B1 * | 7/2003 | Dinkin et al. ............... 705/412 |
| 6,624,532 B1 * | 9/2003 | Davidow et al. ............. 307/39 |

(Continued)

FOREIGN PATENT DOCUMENTS

JP          01017690 A  *  1/1989

*Primary Examiner*—Crystal J. Barnes
(74) *Attorney, Agent, or Firm*—Stephen Krefman; Robert O. Rice; John F. Colligan

(57) ABSTRACT

An energy management system for an appliance comprising an interface to receive a schedule having an off-peak time segment and an on-peak time segment; a control to determine an operation to be performed by the appliance; a mode selecting device to select between an energy management mode and an immediate start mode; and a controller connected to the interface, the control, and the mode selecting device. The controller is arranged such that upon selection of the energy management mode, the controller initiates the operation only when a current time is within the off-peak time segment; and upon selection of the immediate start mode, the controller initiates the operation immediately.

35 Claims, 10 Drawing Sheets

U.S. PATENT DOCUMENTS

| | | | |
|---|---|---|---|
| 6,636,151 B1* | 10/2003 | Busick | 340/521 |
| 6,694,753 B1* | 2/2004 | Lanz et al. | 62/155 |
| 6,934,862 B1* | 8/2005 | Sharood et al. | 713/300 |
| 2003/0233201 A1* | 12/2003 | Horst et al. | 702/62 |
| 2004/0024483 A1* | 2/2004 | Holcombe | 700/122 |
| 2004/0153170 A1* | 8/2004 | Santacatterina et al. | 700/1 |
| 2005/0102068 A1* | 5/2005 | Pimputkar et al. | 700/291 |

\* cited by examiner

ENERGY MANAGEMENT SYSTEM FOR AN APPLIANCE

RELATED APPLICATIONS

Ser. No. 10/127,750 filed Apr. 22, 2002 and U.S. Provisional Application No. 60/366,829 filed Mar. 22, 2002, both of which are incorporated by reference to the extent permitted by law.

BACKGROUND

Many power providers are currently experiencing a shortage of electric generating capacity due to increasing consumer demand for electricity. More specifically, generating plants are often unable to meet peak power demands resulting from a electricity demanded by many consumers at the same time.

In order to reduce high peak power demand, many power providers have instituted time of use metering and rates which include higher rates for energy usage during on-peak times and lower rates for energy usage during off-peak times. As a result, consumers are provided with an incentive to use electricity at off-peak times rather than on-peak times.

Presently, to take advantage of the lower cost of electricity during off-peak times, a user must manually operate appliances or other electronic devices during the off-peak times. This is undesirable because a consumer may not always be present in the home to operate the appliance during off-peak hours. This is also undesirable because the consumer is required to manually track the current time to determine what hours are off-peak and on-peak. Therefore, there is a need to provide a system that automatically operates appliances or other electronic devices during off-peak hours in order to reduce consumer's electric bills and also to reduce the load on generating plants during on-peak hours.

SUMMARY OF THE INVENTION

The present invention provides a process for managing energy usage of an appliance. The process includes receiving a schedule having an off-peak time segment and an on-peak time segment; storing the schedule in a memory; determining a current time; determining an operation that needs to be performed by the appliance; and initiating the operation only if the current time is within the off-peak time segment.

The terms on-peak and off-peak, as used herein are meant to encompass time periods that an energy supplier has designated as referring to periods of high energy demand or cost and periods of low energy demand or cost, respectively. It may be that in some situations, multiple levels are designated by the energy supplier and thus on-peak is meant to refer to those periods where the energy demand or cost is greater than some other period, with the other period being referred to as off-peak. In any given situation, on-peak may not be the highest level and off-peak may not be the lowest level.

The step of receiving the schedule may include inputting the schedule via a user interface on the appliance, receiving the schedule from another appliance via a local area network, receiving the schedule from a computer via a local area network, or downloading the schedule from a server via an internet connection. Additionally, the step of determining an operation may include selecting an operation via a control panel on the appliance, or receiving an operation automatically requested by a control in the appliance.

The process may also include selecting between an energy management mode and an immediate start mode; initiating the operation only if a current time is within the off-peak time segment upon selection of the energy management mode; and initiating the operation immediately upon selection of the immediate start mode.

In one embodiment, the process may further include determining a first amount of time between the current time and an end of the off-peak time segment; determining a second amount of time required to complete the operation; and initiating the operation only if the first amount of time is greater than the second amount of time.

In another aspect, the invention provides an energy management system having an interface to receive a schedule having an off-peak time segment and an on-peak time segment; a control to determine an operation to be performed by the appliance; a mode selecting device to select between an energy management mode and an immediate start mode; and a controller connected to the interface, the control, and the mode selecting device. The controller is arranged such that upon selection of the energy management mode, the controller initiates the operation only when a current time is within the off-peak time, and upon selection of the immediate start mode, the controller initiates the operation immediately.

In yet another aspect, the invention provides an energy management system having means for determining a schedule having an off-peak time segment and an on-peak time segment; means for determining a current time; means for determining an operation to be performed by the appliance; and means for initiating the operation only if the current time is within the off-peak time segment.

DETAILED DESCRIPTION

Figure 4:
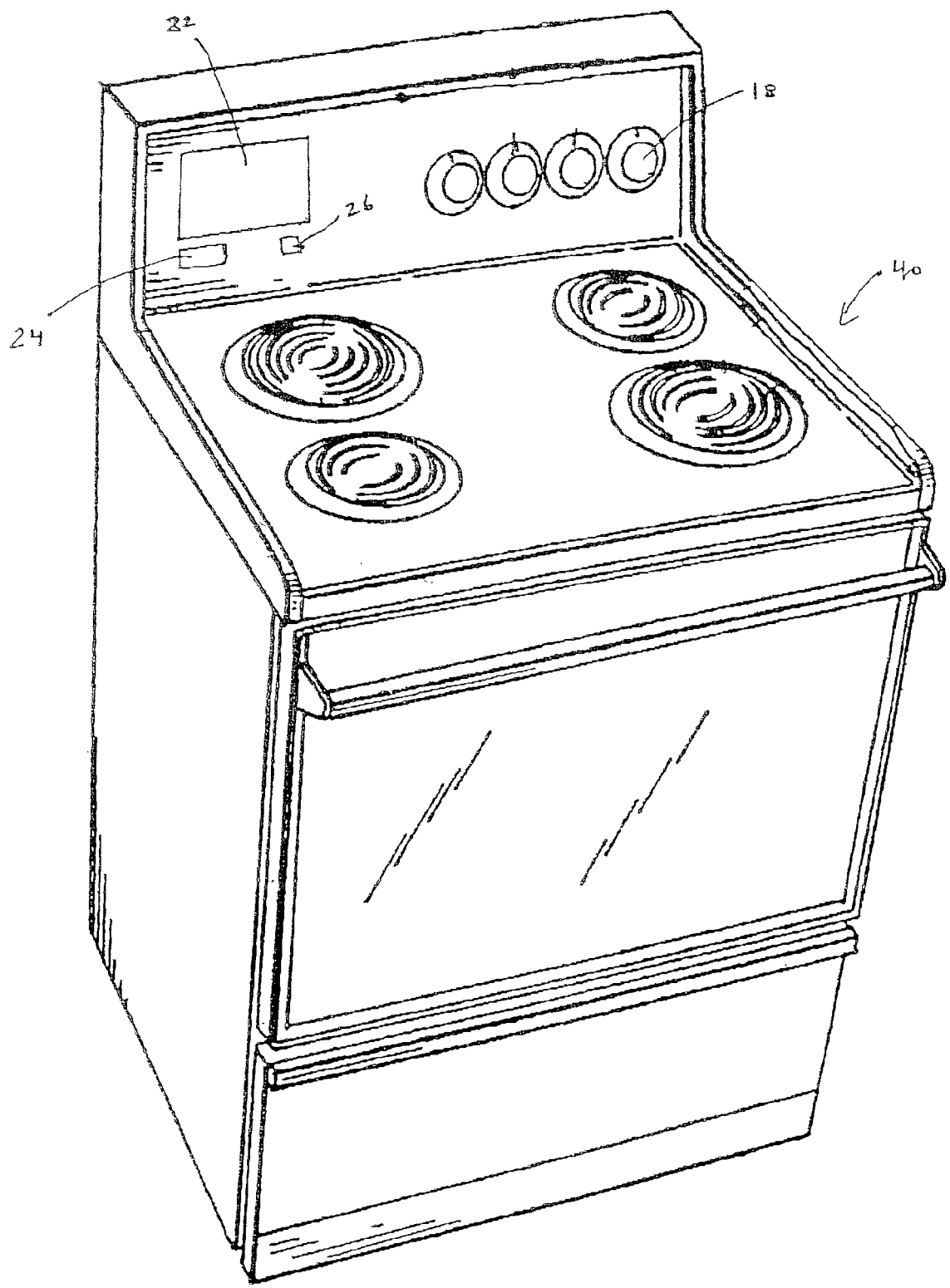
FIG. 4 is a perspective view of an oven utilizing the energy management system of the present invention.
Figure 5:
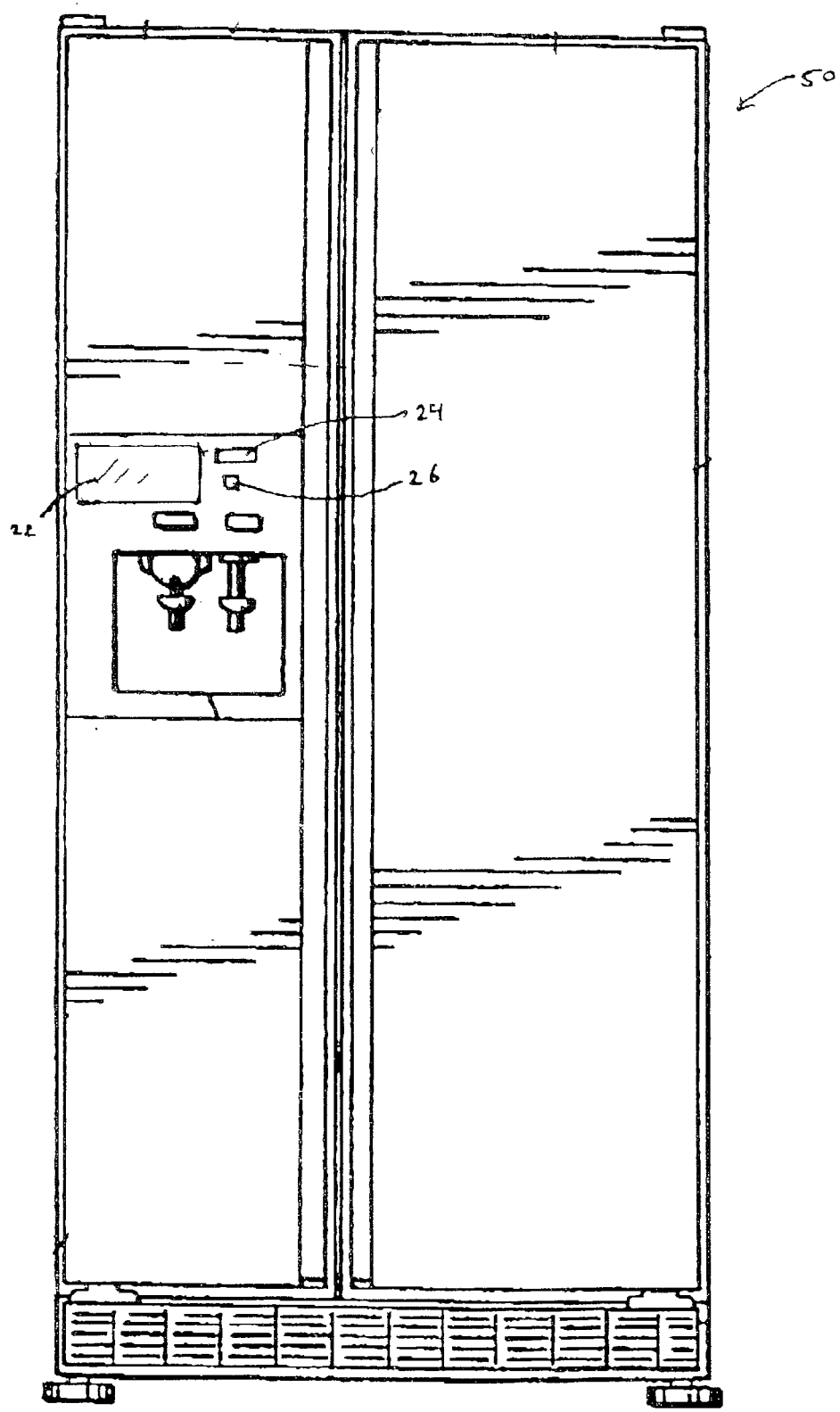
FIG. 5 is a perspective view of a refrigerator utilizing the energy management system of the present invention.

The present invention is an energy management system that may be used with an appliance in order to reduce household electricity costs and also to reduce the load on generating plants during peak hours of electricity usage. The energy management system is applicable to any type of appliance such as a dryer 10 (FIG. 1), a washing machine 20 (FIG. 2), a dishwasher 30 (FIG. 3), an oven 40 (FIG. 4), or a refrigerator 50 (FIG. 5). For illustration purposes, the present invention will be described in association with a dryer.

Figure 1:
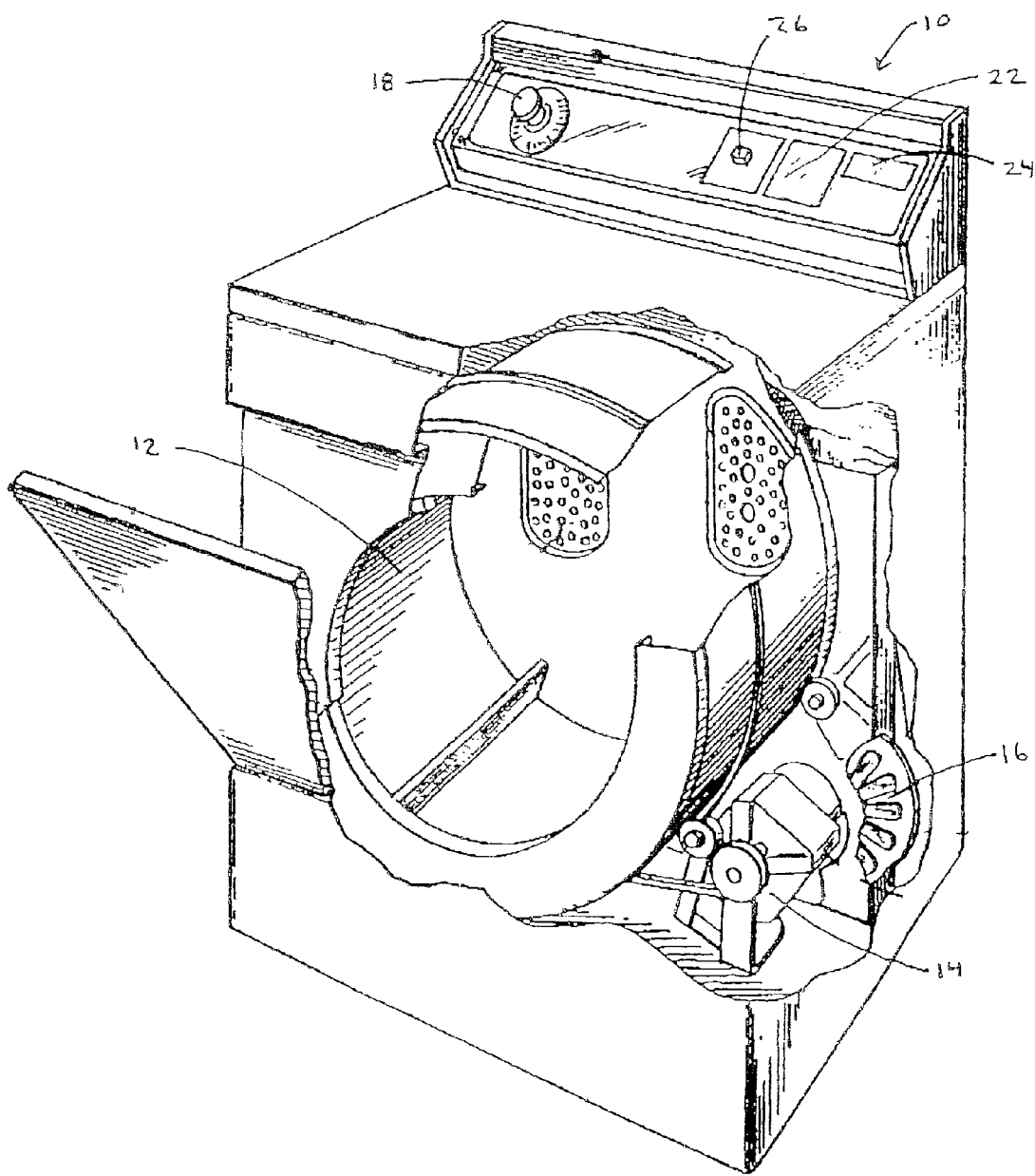
FIG. 1 is a perspective view of a dryer utilizing the energy management system of the present invention.

As shown in FIG. 1, the dryer 10 has a rotatable drum 12, a motor to rotate the drum 14, a hot air blower 16, an electric or gas heater (not shown), and a control panel 18. The control panel 18 may provide control knobs or any other type of interface for selecting an operation cycle of the dryer. For example, the control panel 18 may be used to select between regular, permanent press, or delicate drying cycles.

In one embodiment, the energy management system may include a user interface 22, a clock 24, and a mode selecting device 26. The user interface 22 may be any type of interface such as a touch screen, knobs, sliders, buttons, speech recognition, etc, to allow a user to input a schedule of on-peak times and off-peak times for each day of the week. The schedule of on-peak times and off-peak times for a household may typically be obtained from a generating plant or power utility that services the household. If the schedule of times changes, the user may use the user interface to alter the schedule that was previously entered.

The energy management system may also include a clock 24 that provides information regarding the current time of the day. In one embodiment, the clock 24 also includes a calendar function to provide information regarding the day of the week and the current date. The current time and date may be input or adjusted by the user via controls on the clock.

The mode selecting device 26 allows the user to choose between an energy management mode and an immediate start mode. The mode selecting device 26 may be a single button such that the energy management mode is selected when the button is depressed and the immediate start mode is selected when the button is not depressed, or vice versa. Alternatively, the mode selecting device 26 may also be two separate buttons, a switch, a touch panel, or any other type of device that allows for selection between two modes. Although the control panel 18, the user interface 22, the clock 24 and the mode selecting device 24 are illustrated as four separate elements in FIG. 1, each of these elements, or any combination thereof, may alternatively be incorporated into a single interface or display to provide for ease of use.

Figure 6:
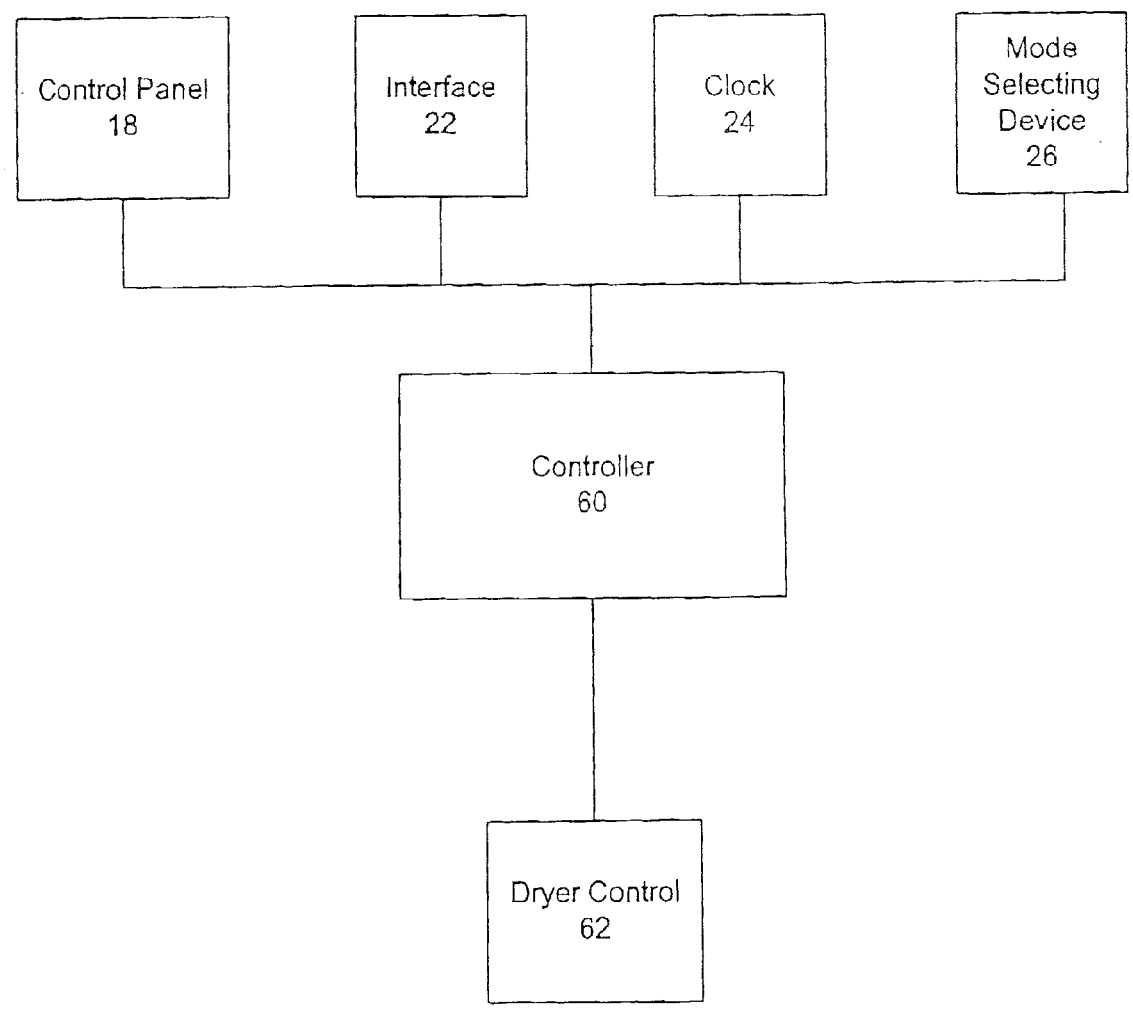
FIG. 6 is a block diagram of the dryer incorporating the energy management system.

As illustrated in FIG. 6, the energy management system further includes a controller 60 connected to the control panel 18 and the mode selecting device 26 in order to receive signals regarding the operation selected by the user via the control panel and the mode selected by the user via the mode selecting device. The controller 60 is also connected to the user interface 22 and the clock 24, and preferably includes a memory for storing the schedule of on-peak and off-peak times input via the user interface, as well as the current time and date. In one embodiment, the controller has a circuit, software, and/or firmware (hereafter collectively referred to as "firmware") to determine a time to initiate the selected operation based on the selected mode. The controller 60 is further connected to a dryer control 62 that controls the rotatable drum, the motor, the electric or gas heater, and the hot air blower of the dryer pursuant to signals sent from the controller to the dryer control.

If the energy management mode is selected by the user, the energy management system, and specifically the controller, will signal the dryer control to initiate a drying cycle selected by the user at the next off-peak time that allows for the drying cycle to be completed entirely within the off-peak time segment. As a result, the drying cycle will be performed during an off-peak time when the rates for electricity are cheaper and the load on the generating plant that provides power for the household is at a lower level. Alternatively, if the user selects the immediate start mode, the energy management system is disabled and the drying cycle is initiated immediately as in a conventional clothes dryer.

Figure 2:
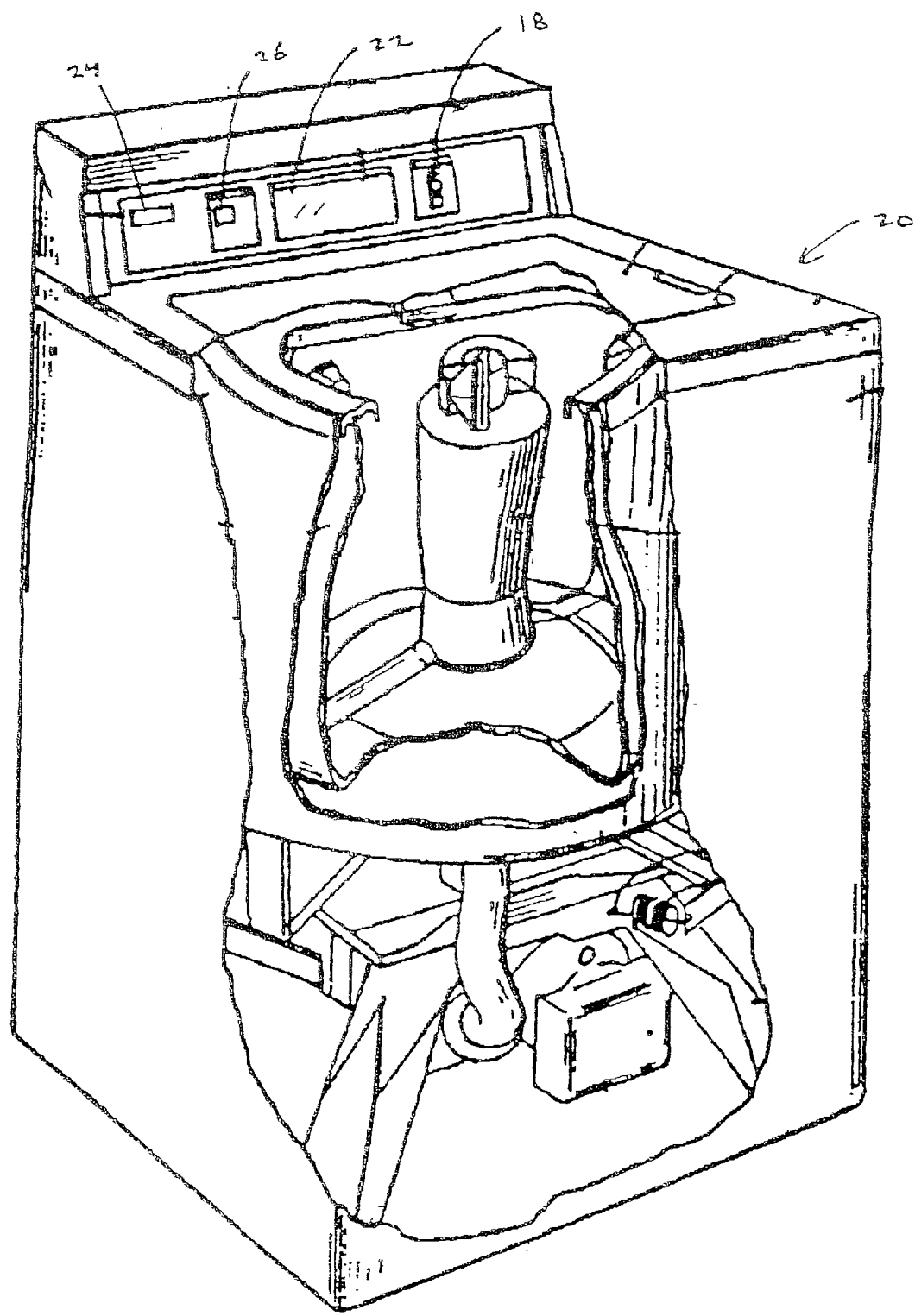
FIG. 2 is a perspective view of a washing machine utilizing the energy management system of the present invention.
Figure 3:
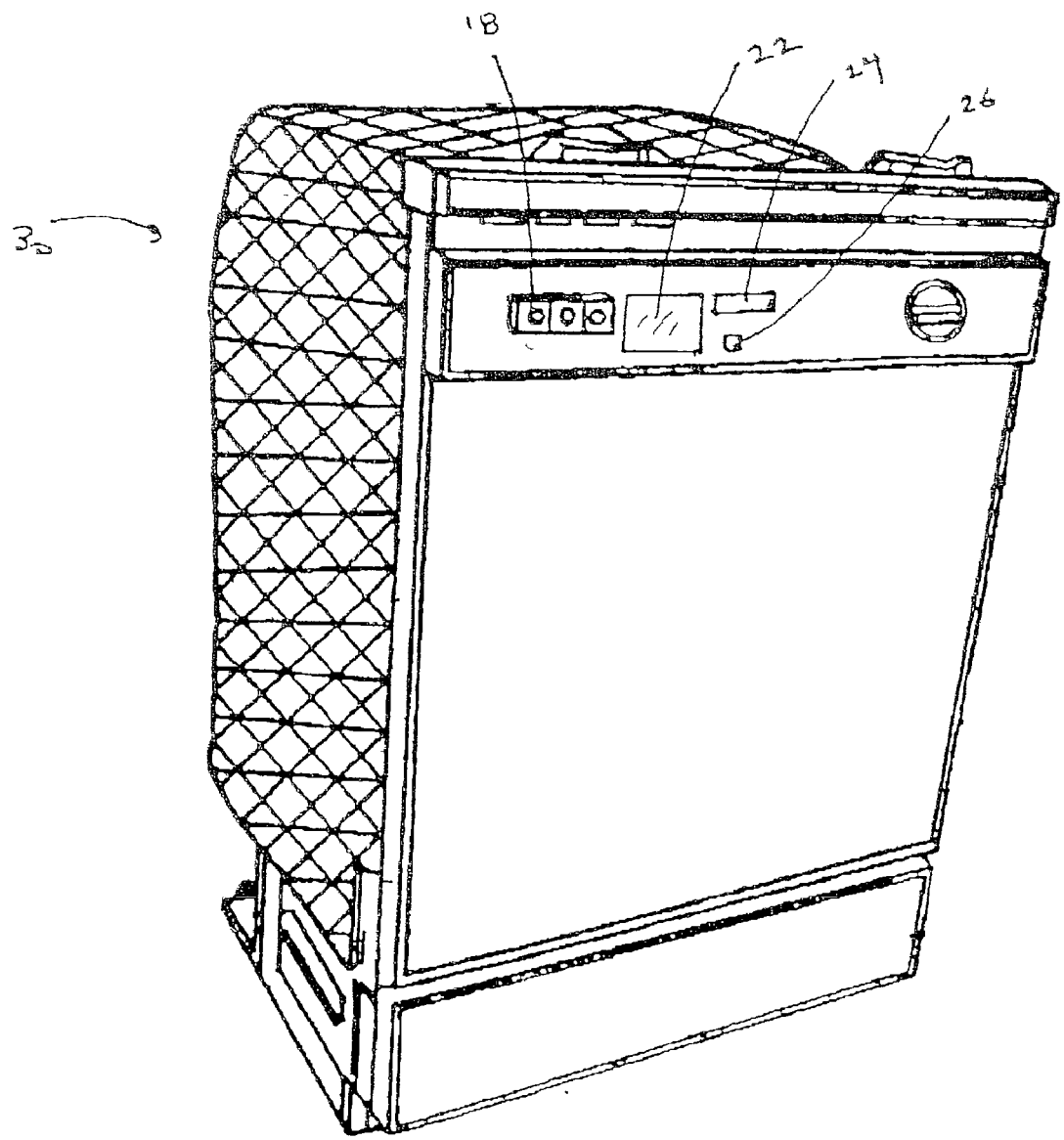
FIG. 3 is a perspective view of a dishwasher utilizing the energy management system of the present invention.

It should be understood that if the energy management system is used with a washing machine (as shown in FIG. 2), the controller may be connected to a washer control to actuate components of the washing machine, including a motor and various valves, to initiate a selected washing cycle according to the selected mode. Similarly, when used with a dishwasher (as shown in FIG. 3), the controller may be connected to a dishwasher control to initiate a selected dishwashing cycle, and in an oven (as shown in FIG. 4), the controller may be connected to an oven control to initiate a selected self cleaning cycle.

Figure 7:
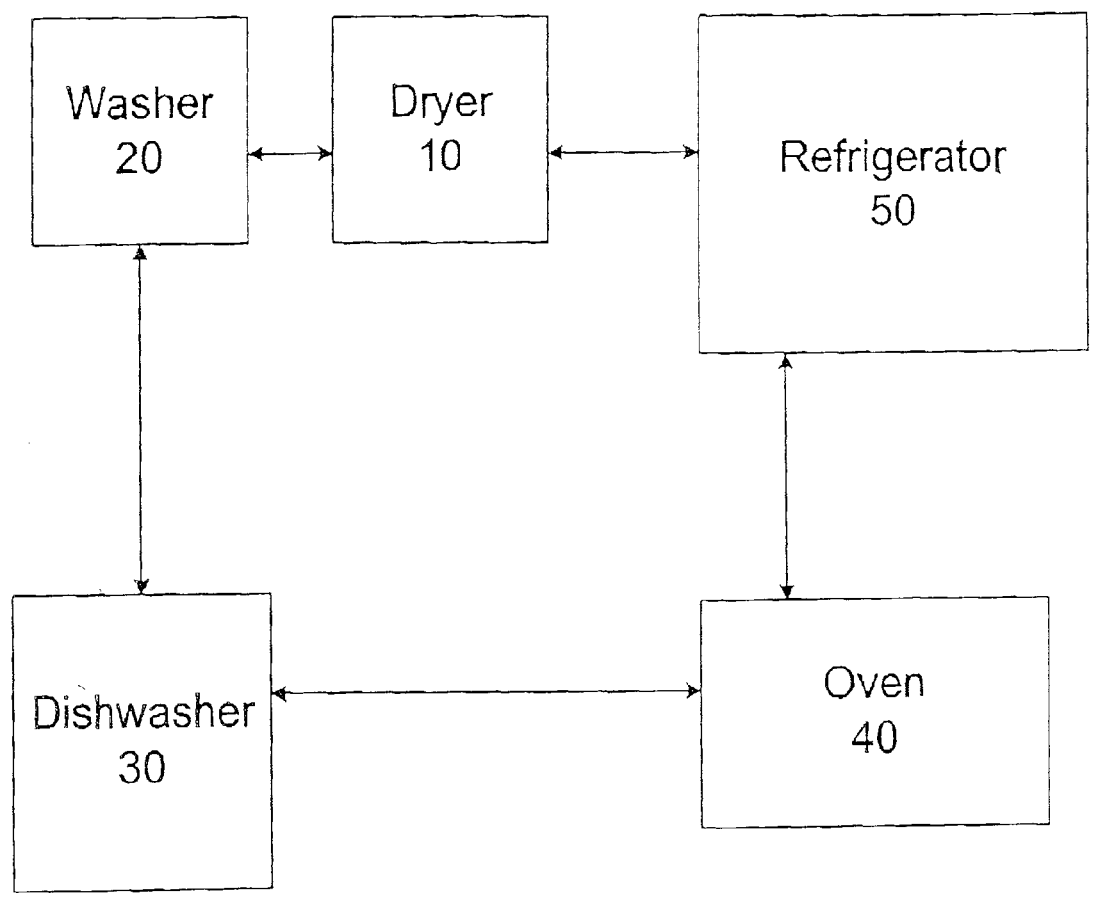
FIG. 7 is a block diagram of one embodiment of the energy management system being utilized with a plurality of appliance connected to each other over a local area network.

In another embodiment shown in FIG. 7, two or more appliances in a household may be connected to each other on a local area network(LAN), and each appliance may include functionality to communicate with each other appliance over the LAN. Once the schedule of on-peak times and off-peak times is input by the user into one appliance, the schedule would become accessible to every other appliance connected on the LAN. Similarly, once the current time and date is input for a single appliance, the current time and date would also become accessible to every other appliance connected on the LAN. As a result, the user need not repetitively enter the current time, date, and schedule of on-peak and off-peak times into each appliance in the household.

Figure 8:
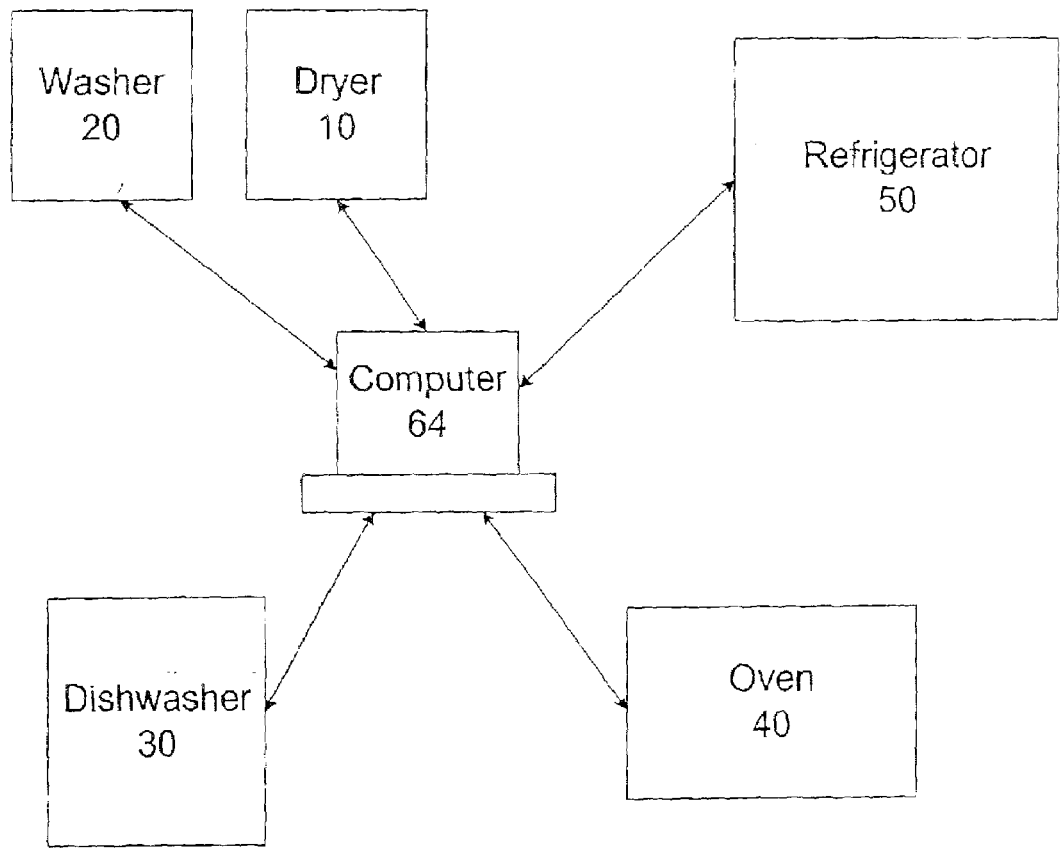
FIG. 8 is a block diagram of one embodiment of the energy management system being utilized with a plurality of appliance connected to a computer over a local area network.

In another embodiment shown in FIG. 8, each of the appliances on the LAN network may also be connected to a computer 64. In this embodiment, the user may input the schedule of on-peak and off-peak times directly into the computer 64 using a keyboard or other input device. The schedule may then be stored on a hard drive or other memory device in the computer and each appliance may be capable of accessing this schedule over the LAN connection. In this embodiment, each appliance may also access the computer clock to determine the current time and date rather than requiring each appliance to have a clock.

Additionally, software for determining whether the current time is within an off-peak time segment and whether the selected operation cycle can be completed entirely within the off-peak time segment may be located on the computer. Accordingly, processing to determine when to initiate an operation cycle may be performed by the computer instead of the controller in the individual appliance.

Figure 9:
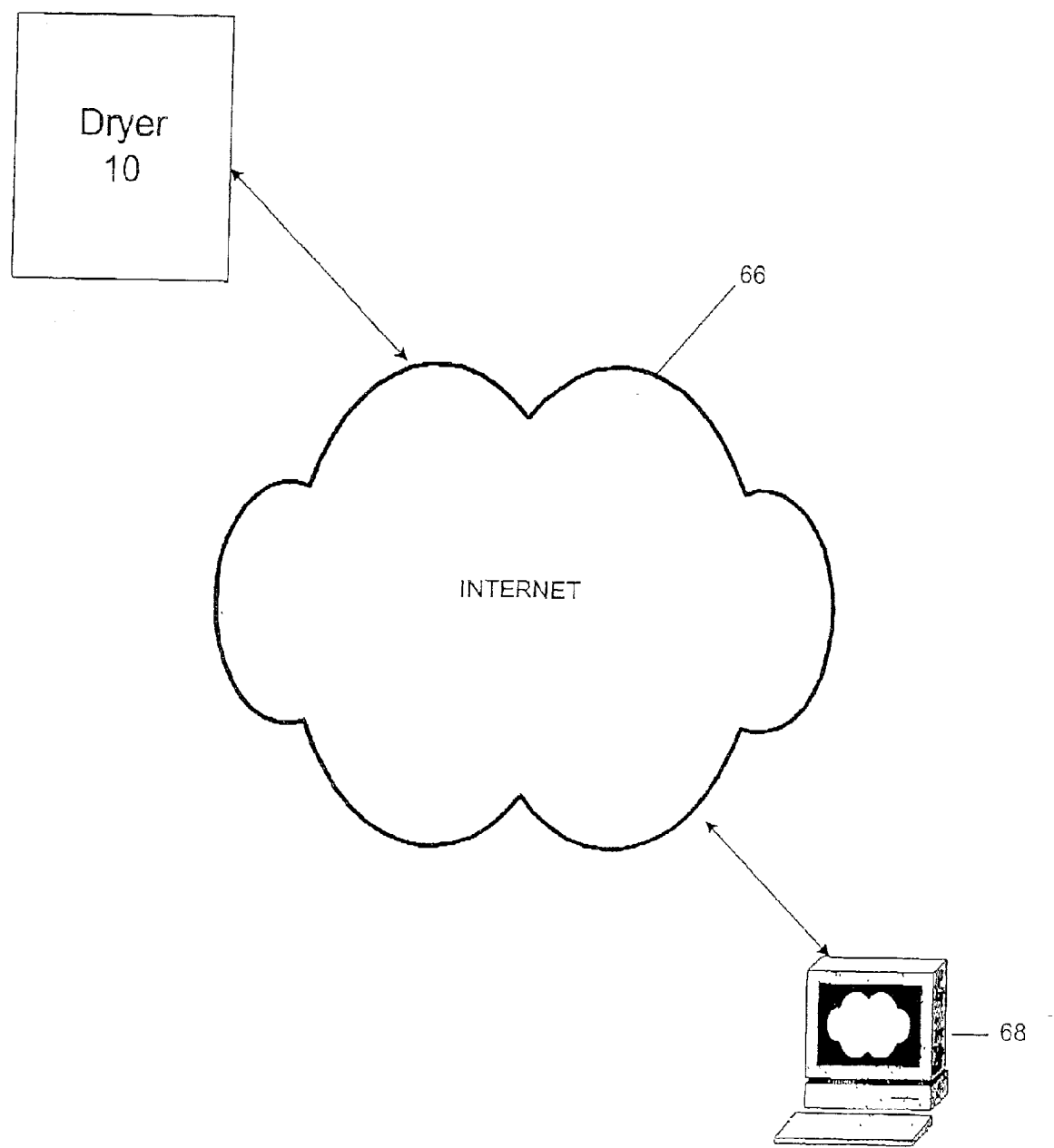
FIG. 9 is a block diagram of one embodiment of the energy management system being utilized with an appliance connected to the internet.

In yet another embodiment shown in FIG. 9, the appliance may also be connected to the internet 66. In one approach, the appliance may, via the internet 66, access a web server 68 maintained by the generating plant or power utility in order to download a schedule of on-peak times and off-peak times. The appliance may also include functionality to periodically check the web server for updates or changes to the schedule. As such, the user would not need to manually input the schedule or maintain clock accuracy.

In another approach, processing to determine when to initiate a selected operation cycle may be performed by the web server instead of the controller in the appliance. Upon selection of the operation cycle to be performed, the appliance may send a signal including the selected operation cycle to the web server. Software located on the web server may then determine a proper time to initiate the operation cycle based upon a schedule of on-peak and off-peak times stored on the server. The determined time for initiating the operation cycle may then be communicated back to the appliance via the internet.

Figure 10:
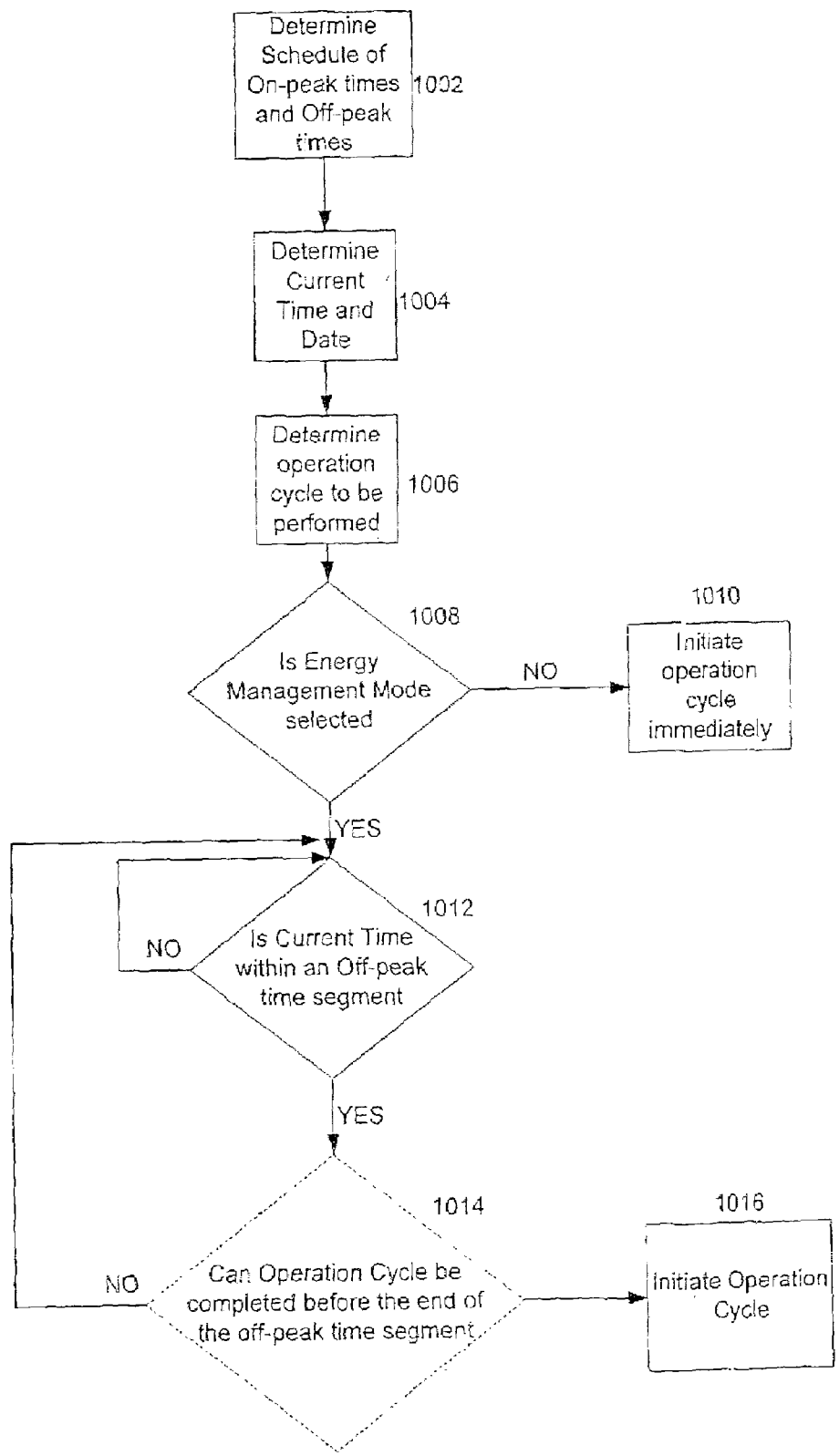
FIG. 10 is a flow chart for initiating and performing the energy management system of the present invention.

FIG. 10 illustrates a method for initiating and performing the energy management system. In Step 1002, the schedule of on-peak times and off-peak times for each day of the week is determined and preferably stored in the memory in the controller. Step 1004 then determines the current time. As discussed above, both the schedule and the current time may be input manually via a user interface in the appliance, received from another appliance or a computer over a LAN, or received via the internet. In Step 1006, the user then selects an operation cycle to be performed by the appliance via the control panel. and in Step 1008, the user selects between the energy management mode and the immediate start mode via the mode selecting device.

If the user selects the immediate start mode, the process proceeds to Step 1010 and the operation cycle is initiated immediately. If the user selects the energy management mode in Step 1008, the controller accesses the schedule of on-peak times and off-peak times and checks whether the current time is within an off-peak time segment. (Step 1012) If the current time is not within an off-peak time segment, the selected operation cycle is not initiated and the process remains at Step 1012 until the current time is within an off-peak time segment. If, in Step 1012, the controller determines that the current time is within an off-peak time segment, the process may proceed to optional Step 1014. If optional Step 1014 is not utilized, the process will proceed to Step 1016 to initiate the operation cycle.

In optional Step 1014, the controller then determines whether the operation cycle can be completed before the end of the current off-peak time segment. For example, if the operation cycle will take 40 minutes to complete, the energy management system checks the schedule of on-peak and off-peak times to determine if the current off-peak time segment extends for more than 40 minutes from the current time. If there is a sufficient amount of time in the current off-peak time segment to perform the operation cycle, the process then proceeds to step 1016 and the operation cycles is initiated. If there is not sufficient time to perform the operation cycle within the off-peak time segment, the process returns to Step 1012. As a result, when the energy management mode is enabled, the selected operation cycle is performed entirely during an off-peak time, which reduces the cost of electricity used by the appliance, and also decreases the load on the generating plant during on-peak hours.

Additionally, it should be noted that the operation cycle to be performed need not be selected manually by a user. The appliance may also include a control to detect an operation that is automatically requested by the appliance. As an example, a control in a refrigerator (as shown in FIG. 5) may include a sensor to detect when the ice reservoir requires replenishment. Accordingly, the sensor would send a signal to the controller requesting that the ice maker be actuated to provide more ice. If the energy management mode is selected on the refrigerator, the ice making operation cycle will only be initiated during an off-peak time segment, and preferably during an off-peak time segment that allows for the operation cycle to be completed within the off-peak time segment, as discussed above.

In another embodiment, the user interface may also allow the user to input a deadline by which the operation cycle must be completed. In one approach, the energy management system may simply initiate the operation cycle if the deadline is approached. For example, at 9:00 AM a user may select a drying cycle that requires 1 hour to complete, with a deadline for completing the task by 3:00 PM. If by 2:00 PM, there has been no off-peak time segment that allows for the operation cycle to be completed entirely within the off-peak time segment, the controller will signal the dryer control to initiate the drying cycle in order to complete the task by the requested deadline.

Alternatively, the controller may be adapted to prospectively analyze the schedule of on-peak and off-peak times between the time at which the operation cycle was requested and the deadline. By doing so, the energy management system may maximize the portion of the operation cycle that is performed during off-peak hours. As in the above example, at 9:00 AM a user may select a drying cycle that requires 1 hour to complete, with a deadline for completing the task by 3:00 PM. In this approach, the controller analyzes the schedule between 9:00 AM and 3:00 PM to determine if there is an off-peak time segment that allows for the entire operation cycle to be completed entirely within the off-peak time segment. If such an off-peak time segment exists, the operation will be conducted at the beginning of this off-peak time segment. If there is no off-peak time segment long enough to complete the entire operation cycle, the controller will determine the longest off-peak time segment available prior to the deadline in order to complete as much of the operation as possible within an off-peak time segment.

While various embodiments of the application have been described, it will be apparent to those of ordinary skill in the art that many more embodiments and implementations are possible that are within the scope of this invention. Accordingly, the invention is not to be restricted except in light of the attached claims and their equivalents.

I claim:

1. A method for managing energy usage of an appliance comprising:
   receiving a schedule having an off-peak time segment and an on-peak time segment;
   storing the schedule in a memory;
   determining a current time;
   determining an operation that needs to be performed by the appliance;
   determining a first amount of time between the current time and an end of the off-peak time segment;
   determining a second amount of time required to complete the operation; and
   initiating the operation only if the current time is within the off-peak time segment and only if the first amount of time is greater than the second amount of time.

2. The method of claim 1 further comprising:
   receiving a deadline by which the operation must be completed; and
   initiating the operation such that it is completed prior to the deadline.

3. The method of claim 1 wherein the step of receiving a schedule includes inputting the schedule via a user interface on the appliance.

4. The method of claim 3 wherein the step of storing the schedule includes storing the schedule in a memory located in the appliance.

5. The method of claim 1 wherein the step of receiving a schedule includes receiving the schedule from a computer via a local area network.

6. The method of claim 5 wherein the step of storing the schedule includes storing the schedule in a memory located in the computer.

7. The method of claim 1 wherein the step of receiving a schedule includes downloading the schedule from a server via an internet connection.

8. The method of claim 1 wherein the step of determining an operation includes selecting an operation via a control panel on the appliance.

9. The method of claim 1 wherein the step of determining an operation includes receiving an operation automatically requested by a control in the appliance.

10. A method for managing energy usage of an appliance from a group consisting of a refrigerator, a washing machine, a dishwasher and an oven, comprising:
   receiving a schedule having an off-peak time segment and an on-peak time segment from another appliance of the group via a local area network;
   storing the schedule in a memory;
   determining a current time;
   determining an operation that needs to be performed by the appliance; and initiating the operation only if the current time is within the off-peak time segment.

11. An energy management system for an appliance comprising:
   means for determining a schedule having an off-peak time segment and an on-peak time segment;
   means for determining a current time;
   means for determining an operation to be performed by the appliance;
   means for determining a first amount of time between the current time and an end of the off-peak time segment;
   means for determining a second amount of time required to complete the operation; and
   means for initiating the operation only if the current time is within the off-peak time segment and only if the first amount of time is greater than the second amount of time.

12. The energy management system of claim 11 further comprising:
   means for receiving a deadline by which the operation must be completed; and
   means for initiating the operation such that it is completed prior to the deadline.

13. The energy management system of claim 11 wherein the means for receiving a schedule includes a user interface to input the schedule.

14. The energy management system of claim 13 including a means for storing the schedule which comprises a memory located in the appliance.

15. The energy management system of claim 11 wherein the means for receiving a schedule includes means for receiving the schedule from a computer via a local area network.

16. The energy management system of claim 15 including a means for storing the schedule which comprises a memory located in the computer.

17. The energy management system of claim 11 wherein the means for receiving a schedule includes means for downloading the schedule from a server via an internet connection.

18. The energy management system of claim 11 wherein the means for determining an operation includes a control panel on the appliance to select an operation.

19. The energy management system of claim 11 wherein the means for determining an operation includes means for receiving an operation automatically requested by a control in the appliance.

20. An energy management system for an appliance comprising:
   means for determining a schedule having an off-peak time segment and an on-peak time segment including means for receiving the schedule from another appliance via a local area network;
   means for determining a current time;
   means for determining an operation to be performed by the appliance; and
   means for initiating the operation only if the current time is within the off-peak time segment.

21. An energy management system for an appliance comprising:
   an interface to receive a schedule having an off-peak time segment and an on-peak time segment;
   a control to determine an operation to be performed by the appliance;
   a mode selecting device to select between an energy management mode and an immediate start mode; and
   a controller connected to the interface, the control, and the mode selecting device;
   wherein upon selection of the energy management mode, the controller is arranged to initiate the operation only when a current time is within the off-peak time segment and only if an amount of time between the current time and an end of the off-peak time segment is greater than an amount of time required to complete the operation: and upon selection of the immediate start mode, the controller is arranged to initiate the operation immediately.

22. The energy management system of claim 21 wherein the controller includes a memory for storing the schedule and firmware to determine whether the current time is within the off-peak time-segment.

23. The energy management system of claim 22 wherein the interface is a user interface located on the appliance.

24. The energy management system of claim 23 wherein the control is a control panel located on the appliance and configured to allow user selection of the operation.

25. The energy management system of claim 24 further comprising a clock for providing the current time.

26. The energy management system of claim 21 wherein the appliance is a washing machine.

27. The energy management system of claim 21 wherein the appliance is a dishwasher.

28. The energy management system of claim 21 wherein the appliance is an oven.

29. The energy management system of claim 21 wherein the appliance is a refrigerator.

30. A method for managing energy usage of an appliance comprising:
   receiving information including the times of an off-peak time segment;
   determining a current time;
   determining an operation that needs to be performed by the appliance;
   determining a first amount of time between the current time and an end of the off-peak time segment;
   determining a second amount of time required to complete the operation; and initiating the operation only if the current time is within the off-peak time segment and only if the first amount of time is greater than the second amount of time.

31. A method for managing energy usage of an appliance comprising:
   receiving information including the times of an off-peak time segment;

determining a current time;
determining an operation that needs to be performed by the appliance;
receiving a deadline by which the operation must be completed;
determining a first amount of time between the current time and an end of the off-peak time segment;
determining a second amount of time required to complete the operation;
determining a third amount of time between the current time and the deadline;
determining whether the current time is within the off-peak time segment; and
initiating the operation when the current time is either within the off-peak time segment and the first amount of time is greater than the second amount of time or when the third amount of time substantially equals the second amount of time.

32. A method for managing energy usage of an appliance comprising:
determining a current time;
receiving an operation automatically requested by a control in the appliance;
determining an amount of time required to complete the operation;
determining an off-peak time segment having an amount of time sufficient to complete the operation; and
initiating the operation when the off-peak time segment is sufficiently long to complete the operation.

33. An energy management system for an appliance comprising:
means for determining an off-peak time segment and, in advance, an end of the off-peak time segment;
means for determining a current time;
means for determining an operation to be performed by the appliance; and
means for determining a first amount of time between the current time and the end of the off-peak time segment;
means for determining a second amount of time required to complete the operation; and
means for initiating the operation only if the current time is within the off-peak time segment and only if the first amount of time is greater than the second amount of time.

34. An energy management system for an appliance comprising:
means for determining an off-peak time segment and, in advance, an end of the off-peak time segment;
means for determining a current time;
means for determining an operation that needs to be performed by the appliance;
means for receiving a deadline by which the operation must be completed;
means for determining a first amount of time between the current time and the end of the off-peak time segment;
means for determining a second amount of time required to complete the operation;
means for determining a third amount of time between the current time and the deadline;
means for determining whether the current time is within the off-peak time segment; and
means for initiating the operation when the current time is either within the off-peak time segment and the first amount of time is greater than the second amount of time or if the third amount of time substantially equals the second amount of time.

35. An energy management system for an appliance comprising:
means for determining a current time;
means for receiving an operation automatically requested by a control in the appliance;
means for determining an amount of time required to complete the operation;
means for determining an off-peak time segment having an amount of time sufficient to complete the operation; and
means for initiating the operation when the off-peak time segment is sufficiently long to complete the operation.

* * * * *